3,055,905
NEW SULPHAMYL BENZAMIDES
Wilfried Graf, Binningen, near Basel, and Erich Schmid and Willy G. Stoll, Basel, Switzerland, assignors to Geigy Chemical Corporation, Ardsley, N.Y., a corporation of Delaware
No Drawing. Filed Feb. 16, 1959, Ser. No. 793,242
Claims priority, application Switzerland Mar. 4, 1958
6 Claims. (Cl. 260—294.8)

The present invention concerns new sulphamyl benzamides which have valuable pharmacological properties, as well as processes for the production thereof.

It has surprisingly been found that sulphamyl benzamides of the general formula

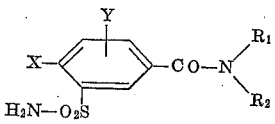

I wherein $R_1$ and $R_2$ each taken separately represents a member selected from the group consisting of an alkyl radical with 1–6 C atoms, an alkyl radical with 1–6 C atoms substituted by a lower alkoxy group, a lower alkenyl radical and a lower hydroxyalkyl radical, $R_1$ represents also a member selected from the group consisting of a cyclohexyl radical, a phenyl radical, a lower alkoxyphenyl radical, a lower alkylmercaptophenyl radical, a chlorophenyl radical, a lower alkylphenyl radical, a benzyl radical, the pyridyl-(2) radical, the thiazolyl-(2) radical and the pyrimidyl-(2) radical, $R_1$ represents also hydrogen, $R_1$ and $R_2$ taken jointly and together with the corresponding nitrogen atom represent a member selected from the group consisting of the piperidino radical and the morpholino radical, X represents a member selected from the group consisting of chlorine, bromine, the methyl and the methoxy radical, and Y represents a member selected from the group consisting of hydrogen, chlorine and the methyl radical, have excellent diuretic activity, for example, on peroral application. As they cause an increased elimination of both sodium ions as well as chlorine ions, the electrolytic equilibrium of the body is maintained.

The compounds defined above can be produced by reacting a reactive functional derivative, in particular a halide or an ester, of a substituted 3-sulphamyl benzoic acid of the general formula

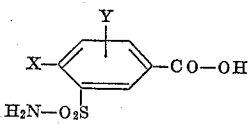

II wherein X and Y have the meanings given above, with a primary or secondary amine of the general formula

III wherein $R_1$ and $R_2$ have the meanings given above, or reacting a salt of a 3-sulphamyl benzoic acid of the general Formula II defined above with the N-halogen carbonyl derivative of an amine of the general Formula III wherein $R_2$ is not hydrogen and $R_1$ and also $R_2$ are not hydroxyalkyl radicals. Chlorides and bromides of sulphamyl benzoic acids of the general Formula II can be easily reacted with numerous amines of the general Formula III in the presence or absence of suitable inert organic solvents, as examples of which are mentioned chloroform, ether and benzene, and in the presence or absence of acid binding agents, for example, excess amine or pyridine, trialkylamines, alkali and earth alkali hydroxides and carbonates. Esters, for example the methyl or ethyl esters of carboxylic acids of the general Formula II react also with the amines defined above on warming in the presence or absence of organic solvents. N-halogen carbonyl derivatives of secondary amines of the general Formula III, for example the N-chlorocarbonyl compounds (carbamyl chlorides) obtained by the action of phosgene on such amines, react on heating with salts, in particular alkali metal salts, of acids of the general Formula I to form the corresponding amides of the general Formula I, carbon dioxide being developed in the reaction.

If desired, following the amide formation, compounds of the general Formula I wherein X is a low molecular alkanoyloxy radical, can be partially hydrolysed, for example with the calculated amount of an alcoholic alkali lye, to form the corresponding compounds which have a hydroxyl group.

Carboxylic acids of the general Formula II are obtained for example, by sulphonating or chlorosulphonating benzoic acids substituted correspondingly to the definition of X and Y, if necessary converting the substituted 3-sulphobenzoic acids into dihalides and partially hydrolysing them, and then reacting the 3-chlorosulphonyl benzoic acids with ammonia. A further method for the production of 3-chlorosulphonyl benzoic acids which can be converted into 3-sulphamyl benzoic acids, in particular the disubstituted 3-chlorosulphonyl benzoic acids, is nitration of suitably substituted benzoic acids, reduction of the substituted 3-nitrobenzoic acids obtained, diazotisation of the substituted 3-aminobenzoic acid obtained and decomposition of the diazonium chlorides with sulphur dioxide in the presence of copper chloride. Examples of substituted sulphamyl benzoic acids of the general Formula II are 3-sulphamyl-4-chlorobenzoic acid, 3-sulphamyl-4-bromobenzoic acid, 3-sulphamyl-4-methylbenzoic acid, 3-sulphamyl-4-ethyl benzoic acid, 3-sulphamyl-4-isopropyl benzoic acid, 3-sulphamyl-4-isobutyl benzoic acid, 3-sulphamyl-4-tert. butyl benzoic acid, 3-sulphamyl-4-methyl-5-chlorobenzoic acid, 3-sulphamyl-4-methoxy benzoic acid, 3-sulphamyl-4-ethoxy benzoic acid, 3-sulphamyl-4-isopropoxy benzoic acid, 3-sulphamyl-4-n-butoxy-benzoic acid, 3-sulphamyl-4-hydroxy benzoic acid, 3-sulphamyl-4-acetoxy benzoic acid, 3-sulphamyl-4.6-dichlorobenzoic acid and 3-sulphamyl-4.5-dimethyl benzoic acid.

Primary amines of the general Formula III which are suitable for reaction with reactive functional derivatives of the above and other sulphamyl benzoic acids are, for example, methylamine, ethylamine, n-propylamine, isopropylamine, n-butylamine, isobutylamine, sec. butylamine, n-amylamine, isoamylamine, n-hexylamine, allylamine, methallylamine, β-methoxy-ethylamine, β-ethoxy-ethylamine, β-hydroxy-ethylamine, β-hydroxy-propyl-amine, cyclohexylamine, cyclohexyl-methylamine, aniline, o-, m- and p-toluidine, p-isopropyl aniline, o-, m- and p-anisidine, p-phenetidine, m-methylmercapto aniline, o-, m- and p-chloraniline, 2.4-dichloraniline, 3.4-dichloraniline, 2.5-dichloraniline, p-bromaniline, benzylamine, p-methylbenzylamine, p-chlorobenzylamine, p-methoxy-benzylamine, α-phenyl- and β-phenyl-ethylamine, γ-phenylpropylamine, 2-aminopyridine, 4-aminopyridine, pyridyl-(3)-methylamine, 2-amino-4-methyl-pyrimidine, 2-amino-4.6-dimethyl-pyrimidine, 2.4-dimethyl-6-amino-pyrimidine, 2-amino-s-triazine, 2-amino-4.6-dimethoxy-s-triazine, 2-aminothiazole and 2-amino-4-methylthiazole; and examples of secondary amines are dimethylamine, diethylamine, di-n-propylamine, di-n-butylamine, diallylamine, bis-(β-hydroxy-ethyl)-amine, bis-(β-methoxyethyl)-amine, N-methyl-cyclohexylamine, dibenzylamine, pyrrolidine, piperidine, morpholine, tetrahydroquinoline as well as N-methyl-, N-ethyl- and N-n-butyl-derivatives of the above primary aromatic, araliphatic and heterocyclic amines.

According to another process, a great number of the substituted 3-sulphamyl benzamides of the general Formula I can be produced by reacting a substituted 3-halogen sulphonyl benzamine of the general formula

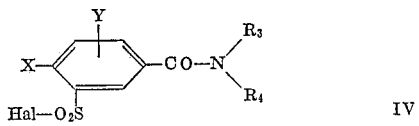

wherein Hal represents chlorine or bromine, $R_3$ and $R_4$ have the meanings given above for $R_1$ and $R_2$ with the exception of hydroxy alkyl radicals, and X and Y have the meanings given above, with ammonia. Generally the sulphonic acid halides of the general Formula IV defined above react easily with ammonia even in the cold. The ammonia can be in aqueous solution and the acid chloride can be dissolved, for example, in chloroform, ether or benzene. If desired, a solvent which is miscible with water such as, for example, alcohol or acetone, can be added.

Substituted 3-chlorosulphonyl benzamides of the general Formula IV can be produced for example by chlorosulphonation of benzamides which contain substituents as defined in the amide group and in the aromatic ring as well as by nitration of such benzamides, reduction of the substituted 3-nitro-benzamides obtained in this or another manner and then diazotisation and decomposition of the diazonium chlorides with sulphur dioxides. Substituted 3-chlorosulphonyl and 3-bromosulphonyl benzamides are also obtained by sulphonation of correspondingly substituted benzamides and modification of the substituted 3-sulpho-benzamides obtained into the halogen sulphonyl compounds, e.g. by means of chlorosulphonic acid, phosphorus oxychloride or phosphorus tribromide. Examples of substituted 3-halogen sulphonyl benzamides of the general Formula IV used according to the present invention are the dimethylamides and diethylamides of 3-chlorosulphonyl-4-chlorobenzoic acid, 3-chlorosulphonyl-4.6-dichlorobenzoic acid, 3-chlorosulphonyl-4-bromobenzoic acid, 3-chlorosulphonyl-4-methyl benzoic acid, 3-chlorosulphonyl-4.5-dimethyl benzoic acid, 3-chlorosulphonyl-4-methoxy benzoic acid, 3-chlorosulphonyl-4-ethoxy benzoic acid and 3-chlorosulphonyl-4-acetoxy benzoic acid.

In addition, compounds of the general formula

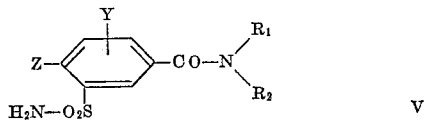

wherein Z represents a halogen atom, the hydroxyl group or a low molecular alkoxy group and Y, $R_1$ and $R_2$ have the meanings given above, can also be produced by converting a substituted 3-sulphamyl-4-amino-benzamide of the general formula

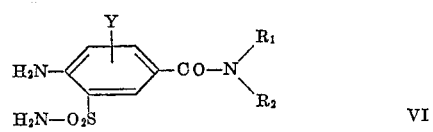

into a diazonium chloride or bromide or into another diazonium salt and modifying so that the compound contains the radical Z given above. The diazonium halides are converted into 4-halogen compounds of the general Formula V by heating them with the corresponding copper halide and water until one mol of nitrogen is split off. 4-hydroxy compounds are obtained by heating the diazonium salts with an aqueous strong acid which is advantageously different from halogen hydracids; if necessary the heating is performed in the presence of a copper salt. To produce 4-alkoxy compounds, the diazonium salts are decomposed by heating with a low molecular alkanol. The conversion into a diazonium salt can be done in the usual way, e.g. with an alkali nitrite and a diluted mineral acid. As, however, in order to avoid the formation of the corresponding 4-unsubstituted compounds, the conversion into the 4-alkoxy compounds should be performed in the most anhydrous alkanols possible, it is of advantage to produce the diazonium salts intended for the decomposition with alkanols in an anhydrous medium, for example by reacting the 4-amino compounds with amyl nitrite and halogen hydracid in the alkanol intended to be used for the decomposition. Examples of starting materials of the general Formula V are 3-sulphamyl-4-aminobenzoic acid-diethylamide, -N-methyl anilide and -N-ethyl-p-toluidide.

Because of their diuretic and saluretic action, the sulphamyl benzamides of the general Formula I are suitable, for example, for the treatment of oedema of various origin, in doses of 1–10 mg./kg. per os. Particularly advantageous compounds are those in which $R_2$ in the general formula is hydrogen.

The following examples further illustrate the production of the new compounds. Parts are given as parts by weight and their relationship to parts by volume is as that of grammes to cubic centimetres. The temperatures are in degrees centigrade.

*Example 1*

23.6 parts of 4-chloro-3-sulphamyl benzoic acid are refluxed with 110 parts of thionyl chloride and 0.5 part of pyridine for 3 hours whereupon a yellow solution is formed. The excess thionyl chloride is then distilled off in the vacuum and the residue, after adding 100 parts by volume of chloroform, is again evaporated to dryness. The crystalline 4-chloro-3-sulphamyl-benzoyl chloride (M.P. 158–160°) is dissolved in 70 parts by volume of warm chloroform and, under exterior cooling, is poured into 120 parts of a 40% aqueous dimethylamine solution. The whole is stirred for half an hour. The chloroform and excess dimethylamine are evaporated off in the vacuum and the 4-chloro-3-sulphamyl dimethyl benzamide which first separates as an oil is crystallized from glacial acetic acid. M.P. 144°.

The following compounds are produced in an analogous manner from the acid chloride mentioned above and the corresponding amine:

4-chloro-3-sulphamyl diethyl benzamide, M.P. 180°;
4-chloro-3-sulphamyl ethyl benzamide, M.P. 210°;
4-chloro-3-sulphamyl-n-butyl benzamide, M.P. 178°; and
4-chloro-3-sulphamyl benzoic acid morpholide, M.P. 232°.

*Example 2*

The crude 4-chloro-3-sulphamyl benzoyl chloride obtained according to Example 1 is dissolved in 100 parts by volume of chloroform and the solution is added dropwise at 40° to 80 parts of aniline. After stirring for 15 minutes at 40°, the reaction mixture is acidified with 160 parts of 30% hydrochloric acid and the 4-chloro-3-sulphamyl benzanilide which precipitates in crystalline form is filtered off. After repeated recrystallizations from alcohol, it is obtained as a colourless substance which melts at 250°.

On using the same acid chloride and the corresponding amine, the following compounds are produced in an analogous manner:

4-chloro-3-sulphamyl-4'-chlorbenzanilide, M.P. 238°,
4-chloro-3-sulphamyl benzoic acid-p-anisidide, M.P. 213°, and 4-chloro-3-sulphamyl benzoic acid pyridyl-(2')-amide, M.P. 231°.

Example 3

The crude 4-chloro-3-sulphamyl benzoyl chloride obtained according to Example 1 is dissolved in 120 parts by volume of chloroform and added dropwise at 20–25° to a solution of 15 parts of 2-aminothiazole and 15 parts of triethylamine in 120 parts of chloroform. After stirring for 15 minutes at 40–45°, the precipitated 4-chloro-3-sulphamyl benzoic acid thiazolyl-(2')-amide is filtered off and repeatedly recrystallised from aqueous alcohol, M.P. 245°.

Example 4

The crude 4-chloro-3-sulphamyl benzoyl chloride obtained according to Example 1 is dissolved in 120 parts by volume of chloroform and the solution is added at 10–20° to 80 parts of β-hydroxyethylamine. The chloroform is evaporated in the vacuum at 40°, the residue is acidified with hydrochloric acid and the mixture is evaporated in the vacuum. The viscous liquid which remains is extracted with ethyl acetate and the β-hydroxyethylamine hydrochloride is filtered off from the concentrated extracts. After further concentration and addition of a little water, the 4-chloro-3-sulphamyl benzoic acid-β-hydroxyethylamide crystallises out. The melting point of the product recrystallised from water is 177°.

Example 5

(a) 20.8 parts of 3-nitro-4-methyl benzoic acid dimethylamide, which is easily obtained by amidation of 3-nitro-4-methyl benzoyl chloride with dimethylamine, are dissolved in 40 parts by volume of alcohol and the solution is added dropwise within 2 hours to a boiling mixture of 100 parts of water, 60 parts by volume of alcohol, 25 parts of ground grey iron casting and 3 parts of 30% hydrochloric acid. After boiling for another 3 hours, the reaction of the mixture is made phenolphthalein alkaline with caustic soda lye and the iron oxide precipitate is filtered off. This is boiled out with alcohol several times. The 3-amino-4-methyl benzoic acid dimethylamide is obtained from the combined filtrates and the crude product (M.P. 96–99°) can be further worked up.

(b) 17.8 parts of 3-amino-4-methyl benzoic acid dimethylamide are dissolved in 26 parts by volume of 9.3 N-hydrochloric acid and 26 parts of water and the solution in diazotised at 5–10° with the addition of ice, with 15 parts of 46% aqueous sodium nitrite solution. The solution of the diazonium salt is poured within one minute into a mixture of 150 parts by volume of a 30% solution of sulphur dioxide in glacial acetic acid, 8 parts of cupric chloride dihydrate, 20 parts of water and 13 parts by volume of 9.3 N-hydrochloric acid. The temperature is raised from 25 to 35° within 10 minutes. After stirring for half an hour at this temperature, no more diazonium salt can be traced. 500 parts of water are added whereupon the 4-methyl-3-chlorosulphonyl benzoic acid dimethylamide separates as a viscous oil. After decanting off the aqueous phase, this oil is washed several times in fresh water and then dissolved in 20 parts by volume of chloroform. To form the amide, this solution is poured into a mixture of 50 parts by volume each of alcohol and 25% aqueous ammonia solution. The solvent and excess ammonia are removed by the introduction of steam and the remaining aqueous solution is concentrated. On cooling, the 4-methyl-3-sulphamyl benzoic acid dimethylamide crystallises out. It melts at 158°.

Example 6

(a) 21.8 parts of 2.4-dichlorobenzoic acid dimethylamide are dissolved in 100 parts of 100% sulphuric acid and the solution is nitrated by the dropwise addition within 1 hour at 50° of 13.4 parts of 50% nitrating acid. After stirring for 2 hours at 50°, the whole is poured onto ice whereupon the 2.4-dichloro-5-nitrobenzoic acid dimethylamide separates in a well crystallised form. After recrystallisation from alcohol, the product melt at 155°.

(b) 26.4 parts of 2.4-dichloro-5-nitrobenzoic acid dimethylamide are added within 2 hours to a boiling mixture of 100 parts of water, 100 parts by volume of alcohol, 25 parts of ground grey iron casting and 3 parts of 30% hydrochloric acid. After stirring for another 3 hours at boiling temperature, the reaction is made phenolphthalein alkaline with caustic soda lye and the iron oxide precipitate is removed by filtration. This is boiled out several times with alcohol. On concentrating the combined filtrates, the 2.4-dichloro-5-aminobenzoic acid dimethylamide crystallises out. M.P. 144–147°.

(c) 23.3 parts of 2.4-dichloro-5-aminobenzoic acid dimethylamide are dissolved in 26 parts by volume of 9.3 N-hydrochloric acid and 26 parts of water and the solution is cooled to 5°, whereupon some of the amine crystallises out in the form of the hydrochloride. The suspension, which can be easily stirred, is diazotised with 15 parts of 46% aqueous sodium nitrite solution under the addition of ice. The solution of the diazonium salt is poured within a minute into a mixture of 150 parts by volume of a 30% solution of sulphur dioxide in glacial acetic acid and a solution of 1 part of cupric chloride dihydrate in 5 parts of water, whereupon the temperature rises by itself from 0–20°. The 4.6-dichloro-3-chlorosulphonyl benzoic acid dimethylamide immediately crystallises out and, after 15 minutes, it is filtered off under suction and washed with water. M.P. 152–153°. The crude product is then dissolved in 50 parts by volume of chloroform and the solution is poured into a mixture of 100 parts by volume each of alcohol and 25% aqueous ammonia solution whereupon the amide is formed practically immediately. The solvent and excess ammonia are removed by introduction of steam whereupon the 4.6-dichloro-3-sulphamyl benzoic acid dimethylamide begins to crystallise out even in the heat. After cooling, the product is filtered off and recrystallised from alcohol. It melts at 246°.

Example 7

20.7 parts of anisic acid diethylamide are added while cooling at 40–45° to 58 parts of chlorosulphonic acid. The solution is heated to 80° within 30 minutes and kept for 1 hour at this temperature. After cooling, the whole is carefully poured into water and ice whereupon the 4-methoxy-3-chlorosulphonyl benzoic acid diethylamide separates in a greasy form. After decanting off the aqueous phase, the product is thoroughly mixed with fresh water several times and finally dissolved in 50 parts by volume of chloroform. The cloudy solution is poured at 15–25° into a mixture of 100 parts of ethanol and 100 parts of 25% aqueous ammonia. After standing for 15 minutes, the solvent and excess ammonia are removed by the introduction of steam. The 4-methoxy-3-sulphamyl diethylbenzamide crystallises out of the remaining aqueous solution in the form of needles which melt at 149°.

Example 8

A solution of 25.7 parts of 4-chloro-3-sulphamyl benzoyl chloride in 100 parts by volume of warm chloroform is added, under exterior cooling with ice water, to 100 parts by volume of aqueous 35% methylamine solution. The mixture is warmed for 15 minutes at 40° and then evaporated to dryness in the vacuum. The remaining crude 4-chloro-3-sulphamyl benzoic acid methylamide is recrystallised from butanol and then melts at 232°.

Example 9

A solution of 25.7 parts of 4-chloro-3-sulphamyl benzoyl chloride in 200 parts by volume of chloroform is slowly added, under exterior cooling with ice water, to a mixture of 9.5 parts of 2-amino-pyrimidine and 12 parts of triethylamine in 100 parts by volume of chloroform. The whole is heated for 15 minutes at 40° and then evaporated to dryness in the vacuum. The residue is taken up in water, the solution is acidified, the precipitate is filtered off under suction and recrystallised from diluted acetic acid. The 4-chloro-3-sulphamyl benzoic acid-pyrimidyl-(2')-imide so obtained decomposes and turns brown at 270–300°.

In an analogous manner, on using 10.2 parts of n-hexylamine instead of the 2-amino-pyrimidine, 4-chloro-3-sulphamyl benzoic acid-n-hexylamide (M.P. 132° from 10% acetic acid) is obtained; and on using 10 parts of cyclohexylamine, 4-chloro-3-sulphamyl benzoic acid cyclohexylamide (M.P. 207° from 50% acetic acid) is obtained.

*Example 10*

A solution of 25.7 parts of 4-chloro-3-sulphamyl benzoyl chloride in 200 parts by volume of warm chloroform is slowly added, under exterior cooling with ice water, to a mixture of 40 parts of piperidine and 60 parts by volume of chloroform. The whole is warmed for 15 minutes at 40° and the product is worked up as described in Example 9. The crude product is recrystallised from 10% acetic acid whereupon the 4-chloro-3-sulphamyl benzoic acid piperidide (M.P. 183°) is obtained.

4-chloro-3-sulphamyl benzoic acid benzylamide (M.P. 193° from 30% acetic acid) is obtained in an analogous manner on using the same amount of benzylamine.

*Example 11*

200 parts by volume of abs. diethylamine are added to 25 parts of 4-chloro-3-sulphamyl benzoic acid methyl ester and the whole is then heated in an autoclave for 15 hours at 70°. The solution formed is cooled, then concentrated in the vacuum and the diethylamide is worked up in the usual way. After recrystallising once from alcohol, the 4-chloro-3-sulphamyl benzoic acid diethylamide is obtained which melts at 178.5–180.5°.

The following compounds can be produced in an analogous manner:

4-chloro-3-sulphamyl benzoic acid allylamide, M.P. 198–203°,
4-chloro-3-sulphamyl benzoic acid isopropylamide, M.P. 224–227°,
4-chloro-3-sulphamyl benzoic acid tert. butylamide, M.P. 162–165°,
4-chloro-3-sulphamyl benzoic acid methoxyethylamide, M.P. 181–183°,
4-chloro-3-sulphamyl benzoic acid-(4'-methylmercapto)-anilide, M.P. 238.5–242°,
4-chloro-3-sulphamyl benzoic acid-(2'.6'-dimethyl)-anilide, M.P. 243–245.5°,
4.6-dichloro-3-sulphamyl benzoic acid anilide, M.P. 222–224°,
4.6-dichloro-3-sulphamyl benzoic acid-(3'.4'-dichloro)-anilide, M.P. 231–234°,
4.6-dimethyl-3-sulphamyl benzoic acid anilide,
4.5-dimethyl-3-sulphamyl benzoic acid anilide,
4-bromo-3-sulphamyl benzoic acid isopropylamide, M.P. 246–249.5°,
4-bromo-3-sulphamyl benzoic acid anilide, M.P., 224–226.5°.

What we claim is:

1. A sulphamyl benzamide of the formula

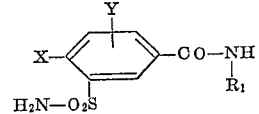

wherein X is a member selected from the group consisting of chlorine, bromine, methyl and methoxy; Y is a member selected from the group consisting of hydrogen, chlorine and methyl; and $R_1$ is pyridyl-(2).

2. A sulphamyl benzamide of the formula

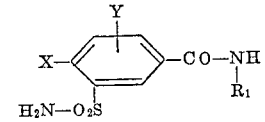

wherein X is a member selected from the group consisting of chlorine, bromine, methyl and methoxy; Y is a member selected from the group consisting of hydrogen, chlorine and methyl; and $R_1$ is lower hydroxyalkyl.

3. A sulphamyl benzamide of the formula

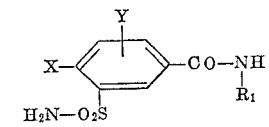

wherein X is a member selected from the group consisting of chlorine, bromine, methyl and methoxy; Y is a member selected from the group consisting of hydrogen, chlorine and methyl; and $R_1$ is lower alkyl phenyl.

4. 4-chloro-3-sulphamyl benzoic acid pyridyl-(2')-amide.

5. 4-chloro-3-sulphamyl benzoic acid-β-hydroxyethyl-amide.

6. 4-chloro-3-sulphamyl benzoic acid-(2'.6'-dimethyl)-anilide.

References Cited in the file of this patent

UNITED STATES PATENTS

| | | |
|---|---|---|
| 1,153,121 | Lagutt | Sept. 7, 1915 |
| 2,228,303 | Fischer | Jan. 14, 1941 |
| 2,809,194 | Novello | Oct. 8, 1957 |
| 2,910,488 | Novello | Oct. 27, 1959 |

OTHER REFERENCES

Steinkopf: Journal für praktische Chemie, vol. 117, p. 33 (1927).

Beilstein: Handbuch der Organischen Chemie, vol. 11, pp. 387–388 (1928).